Feb. 13, 1951 — A. J. KAUFFMAN — 2,541,365

WEIGHING SCALE

Filed Jan. 24, 1946 — 6 Sheets-Sheet 1

Inventor
ALBERT J. KAUFFMAN
By Bernard F. Garvey
Attorney

Feb. 13, 1951  A. J. KAUFFMAN  2,541,365
WEIGHING SCALE
Filed Jan. 24, 1946  6 Sheets-Sheet 2

Inventor
ALBERT J. KAUFFMAN
By Bernard F. Garvey
Attorney

Feb. 13, 1951     A. J. KAUFFMAN     2,541,365
WEIGHING SCALE

Filed Jan. 24, 1946     6 Sheets-Sheet 3

Inventor
ALBERT J. KAUFFMAN
By Bernard F. Garvey
Attorney

Feb. 13, 1951 A. J. KAUFFMAN 2,541,365
WEIGHING SCALE
Filed Jan. 24, 1946 6 Sheets-Sheet 4

Inventor
ALBERT J. KAUFFMAN
By Bernard F. Lavely
Attorney

Feb. 13, 1951 A. J. KAUFFMAN 2,541,365
WEIGHING SCALE
Filed Jan. 24, 1946 6 Sheets-Sheet 5
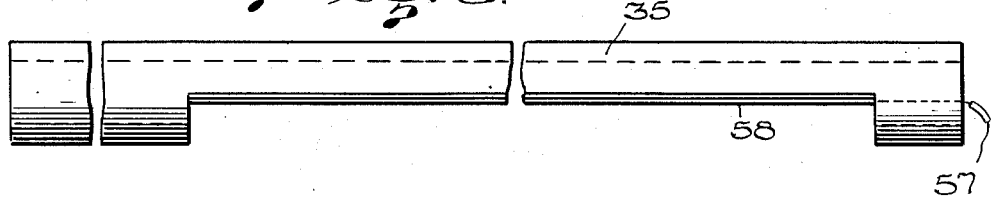
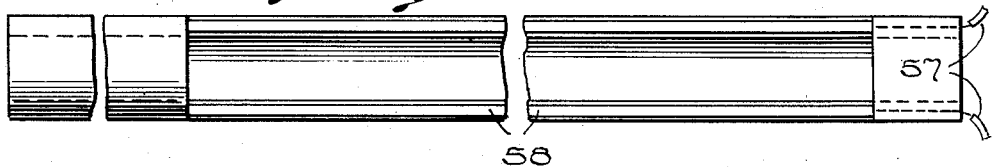
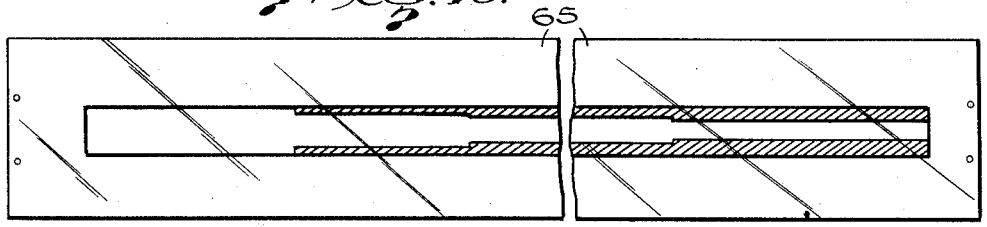
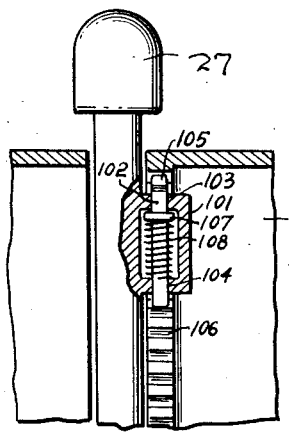
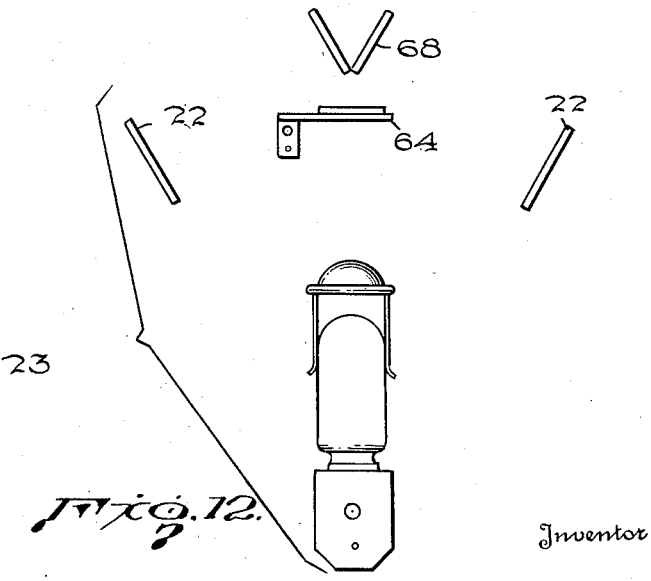
Inventor
ALBERT J. KAUFFMAN
By Bernard F. Garvey
Attorney Feb. 13, 1951 — A. J. KAUFFMAN — 2,541,365
WEIGHING SCALE
Filed Jan. 24, 1946 — 6 Sheets-Sheet 6
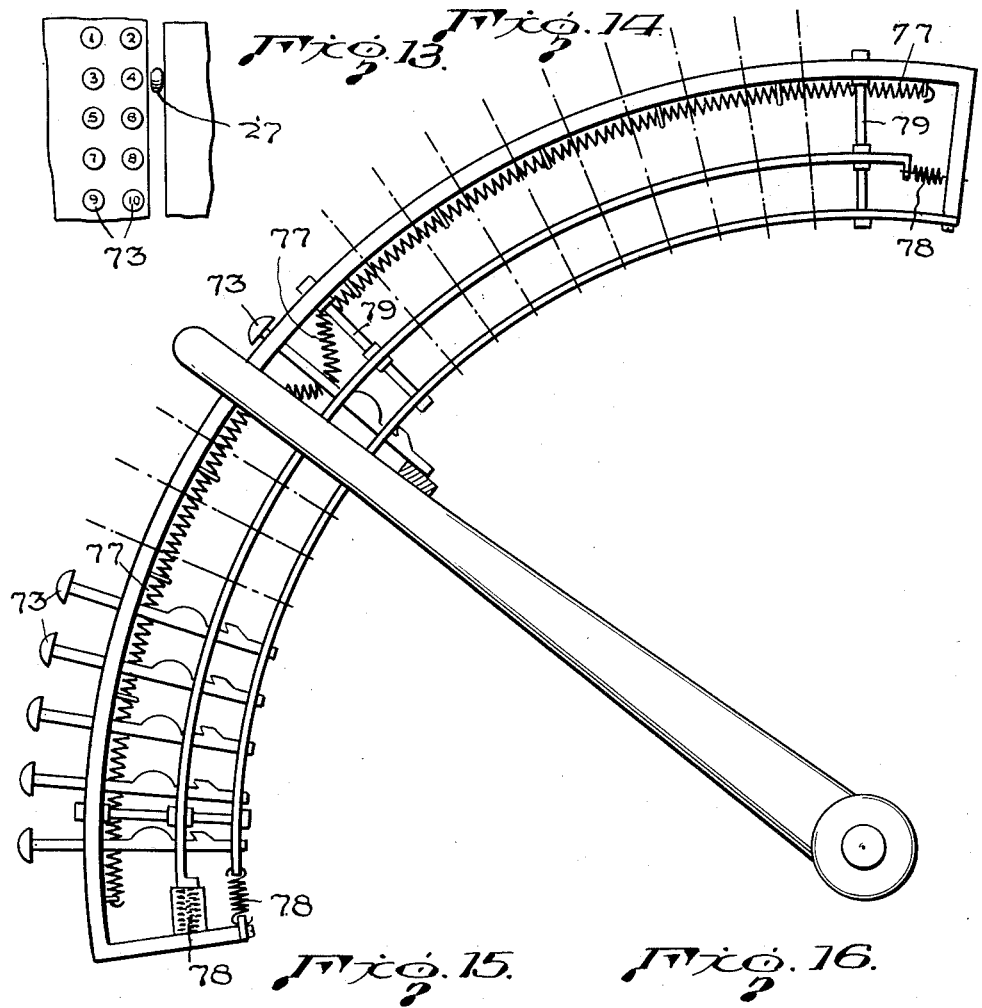
Inventor
ALBERT J. KAUFFMAN
By Bernard F. Gawley
Attorney Patented Feb. 13, 1951

2,541,365

UNITED STATES PATENT OFFICE 2,541,365

WEIGHING SCALE

Albert J. Kauffman, New York, N. Y., assignor to Sanitary Scale Company, a corporation of Illinois Application January 24, 1946, Serial No. 643,037

4 Claims. (Cl. 88—24)

The present invention comprises a computing weighing scale, an object of which is to visibly indicate, to the merchant and customer, the price per pound, the weight and sale price of the merchandise being weighed.

It is well known in the art to provide scales which make available to the vendor and vendee certain information anent the merchandise being sold including one price and amount for merchandise being weighed, usually in a single column. While this has been recognized as an advance in the art, it still lacks all the information necessary for consummation of the sale. Correspondingly, this leaves reckoning for determination by the sales person which retards execution of the sale. With the instant invention, the price per pound, the weight and the sale price is each singly displayed in an individual column clearly visible to persons on opposite sides of the scales.

It is also within the contemplation of this invention to provide a scale for simultaneously displaying the price per pound, weight and sales price clearly and legibly from both sides of the scales regardless of scale calibrations; to provide manually operated mechanism for selecting certain indicia indicative of price and concurrently actuating a viewing device, movement of the viewing device being possible from any intermediate position without first returning the viewing device to a starting position; to provide an illuminated indicia bearing transparent cylinder operable under weight of the merchandise, and an illuminated indicia bearing transparent short cylinder manually movable independently of the cylinder, to project the weight and sale price and the price per pound respectively of the merchandise; to provide mechanism for carrying out the teaching of this invention, which is applicable to standard cylinder type weight computing scales; and to provide a scale employing standard weighing apparatus, with which the present improvement is synchronized, yet being less complicated and employing fewer parts than present computing scales incapable of carrying out the objects of this invention.

Other objects of the invention will be apparent from the following description of the present preferred forms of the invention, wherein:

Figure 8 is a fragmentary elevational view of the tubular supporting shaft with the worm gear removed therefrom;

Figure 9 is a bottom plan view of the same;

Figure 10 is a fragmentary plan view of the stepped aperture plate employed between the cylinder casing and the indicia reflecting mechanism;

Figure 11 is a detail fragmentary sectional view taken on the lines 11—11 of Figure 4 when looking in the direction of the arrows showing to advantage the manner of mounting the price selecting lever in the weight housing;

Figure 12 is a detail fragmentary elevational view of a modified form of indicia reflecting mechanism;

Figure 13 is a fragmentary elevational view of a further modified form of the invention wherein price push buttons are used instead of price indicia illustrated in Figure 1;

Figure 14 is a detail fragmentary elevational view illustrating the modus operandi of the price selecting lever when the push buttons illustrated in Figure 13 are employed;

Figure 15 is a fragmentary plan view of the inside curved apertured plate in which the push buttons shown in Figures 13 and 14 operate;

Figure 16 is a similar view of the outside plate; and

Figure 17 is a perspective view of one of the price selecting push buttons of this invention.

Figure 1:
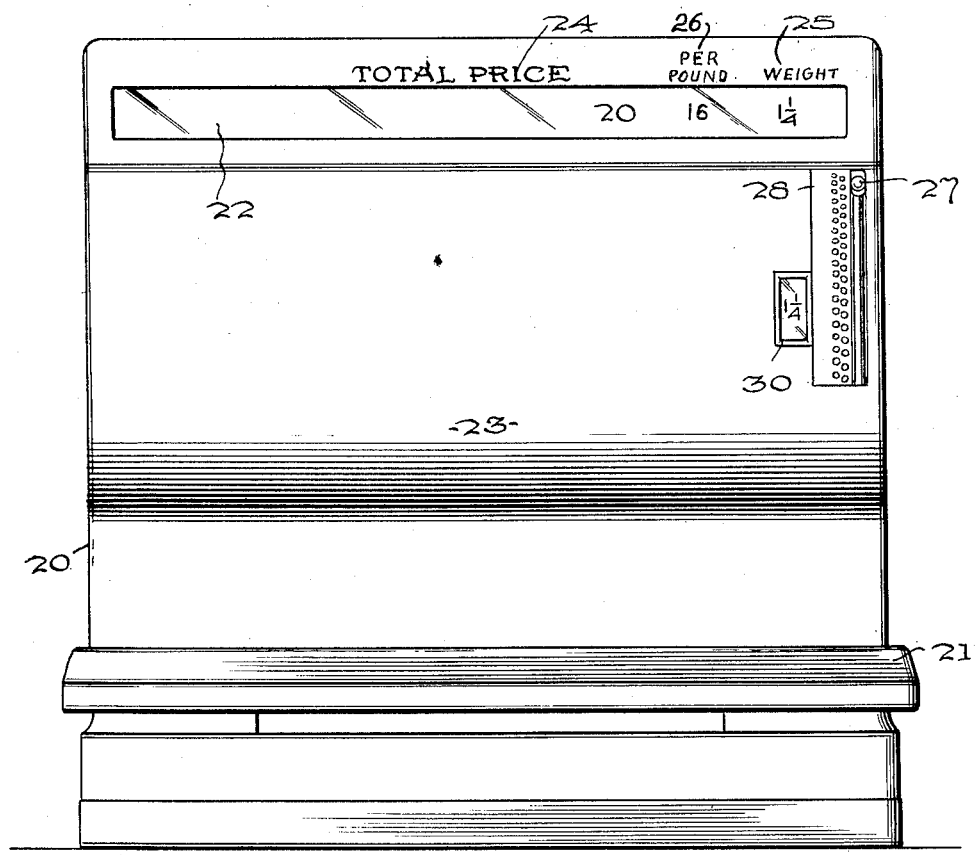
Figure 1 is an elevational view of a computing scale constructed in accordance with the present invention viewed from the merchant's side of the scales.
Figure 2:
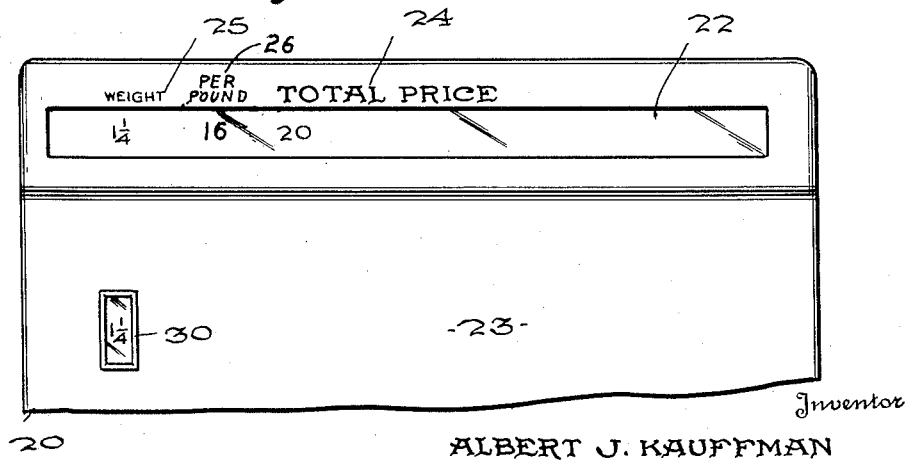
Figure 2 is a fragmentary elevational view of the scale viewed from the customer's side of the scales.

The device of this invention includes a cylinder type computing scale generally designated 20. The scale embodies a merchandise receiving platform 21 and a pair of semi-transparent screens 22. The screens are mounted in opposite sides of a vertical portion 23 of the scale housing, remote from the platform 21. Above each screen 22 the housing is provided with informative data 24, 25 and 26 consisting of the notations "Total price," "Weight" and "Per pound" respectively. Since the data appears on both sides of the scale, the customer and merchant know where to look for the total price of the merchandise, the weight of the merchandise and the price per pound of the merchandise. These items are simultaneously flashed on both of the screens 22. The weight is flashed under pressure of merchandise on the platform. The price per pound and total price are concurrently flashed under manipulation of a manually operated selective lever 27. The extent of movement of the lever 27 may be left entirely within the discretion of the operator. For the guidance of the operator, price indicia 28 are posted on the operator's or merchant's side of the scale as shown in Figure 1. Price selecting keys 73, shown in Figures 13, 14 and 17, more fully hereinafter described, may however be used to limit the extent of movement of the lever 27. Each side of the portion 23 of the scale housing is also equipped with a normally closed weight viewing bezel 30.

Figure 3:
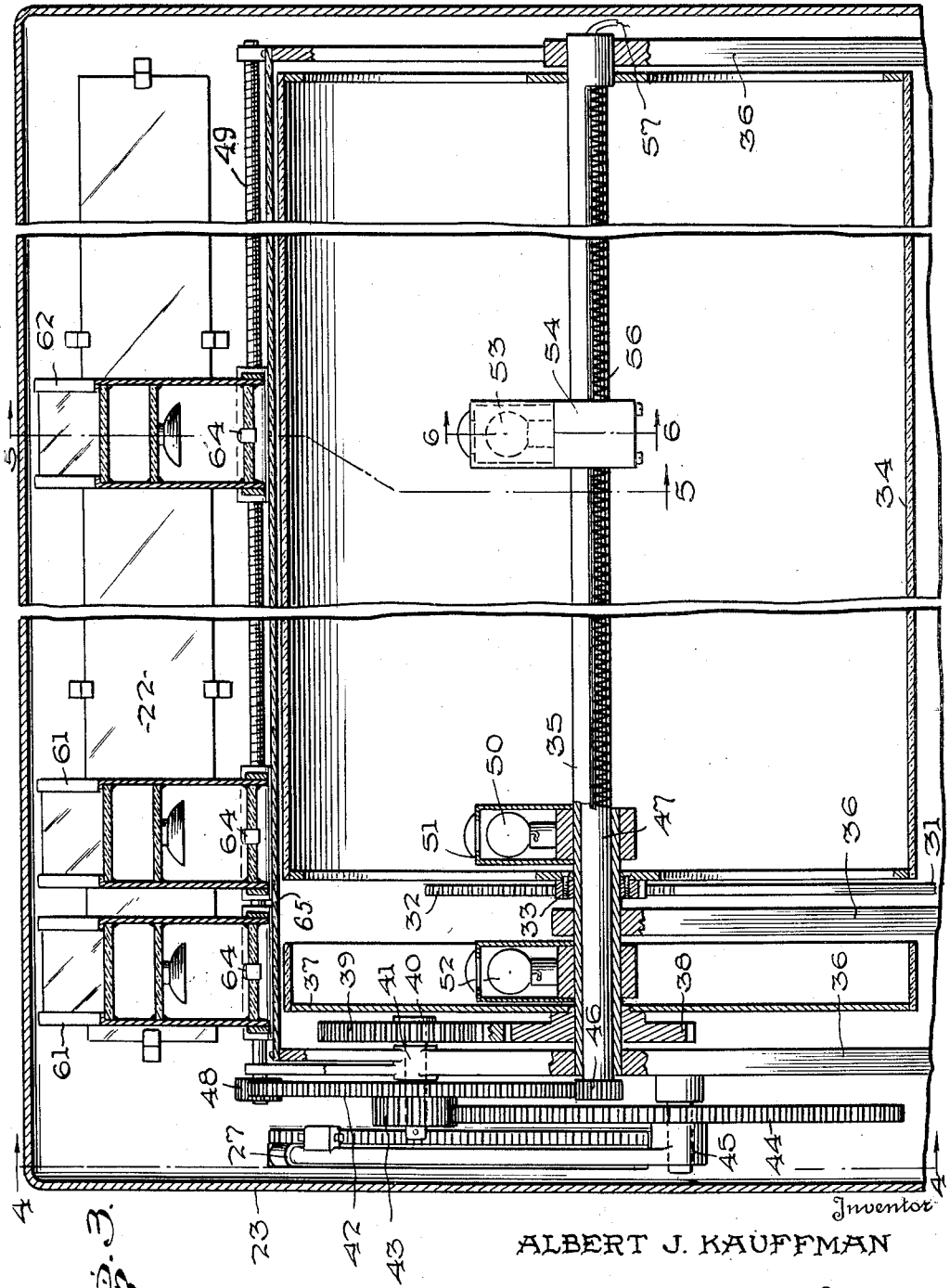
Figure 3 is a fragmentary longitudinal sectional view of the scale taken through the scale housing.
Figure 4:
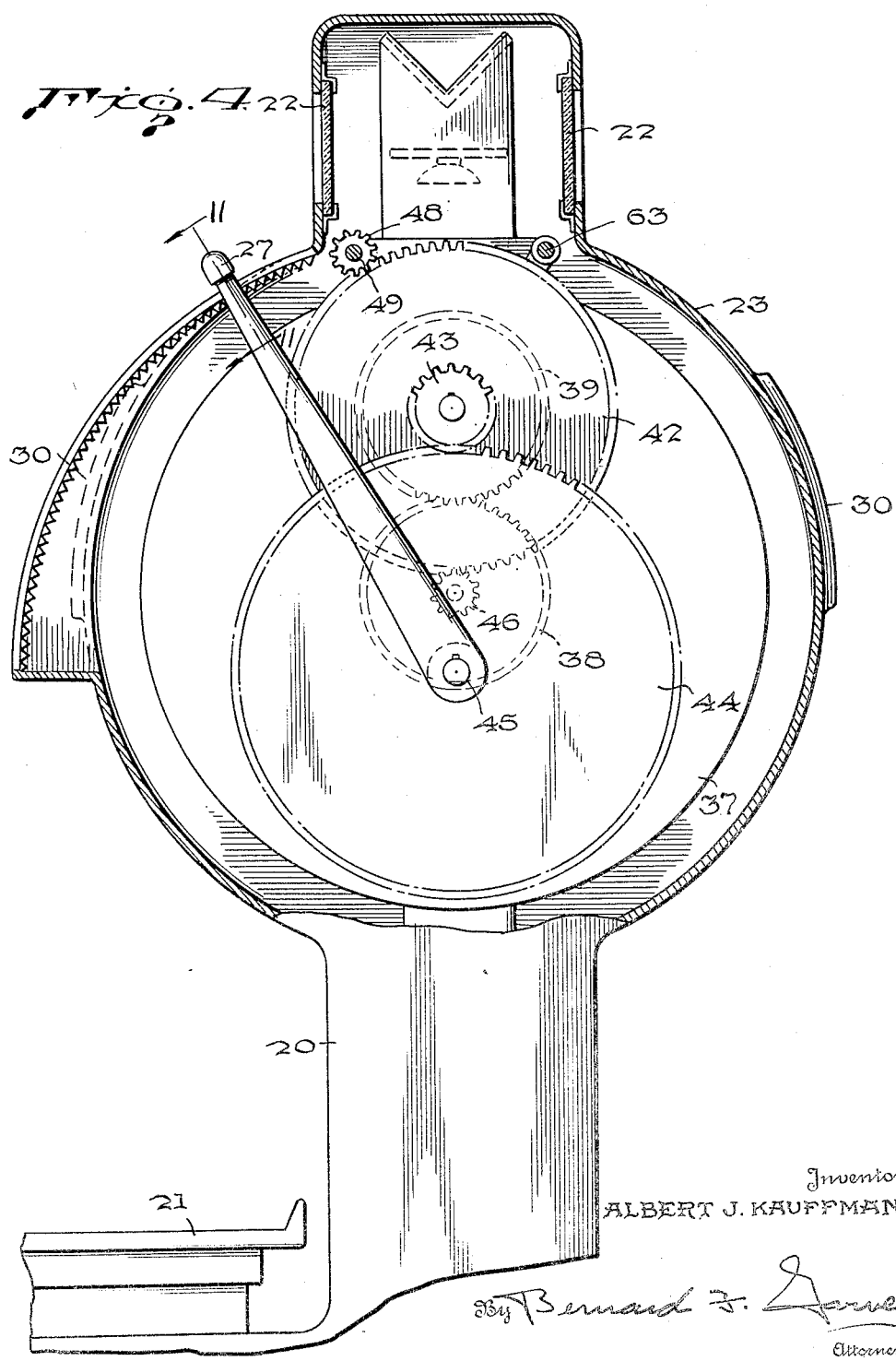
Figure 4 is a vertical sectional view taken on the line 4—4 of Figure 3 and showing to advantage the price selecting lever and associate gearing mechanism.

Since the weighing mechanism per se and the indicia charts form no part of this invention, illustration and description thereof has been omitted. However, the drawings include in Fig. 3, a rack rod 31, the lower terminal of which is operatively connected to the weighing platform 21. The upper end of the rod is formed to provide a rack 32 which engages in mesh with a pinion 33 carried by and secured to one end of a transparent indicia bearing cylinder 34. The cylinder is mounted to rotate on a tubular supporting shaft 35. The ends of the shaft 35 extend into and are supported by a frame 36 which extends upwardly into the vertical portion 23 of the scale housing, beyond the ends of the cylinder 34. Also rotatably mounted on the shaft 35 and interposed between one end of the cylinder 34 and frame 36 is a transparent indicia bearing short cylinder 37. Movement is imparted to the short cylinder 37 through a short cylinder carried gear 38. The gear 38 is actuated by the selective lever 27, through a train of gears. As shown in Figures 3 and 4, gear 38 is in mesh with gear wheel 39 carried by stub shaft 40. The shaft 40 extends through a bearing 41 formed in one side of the frame 36, the shaft continuing through a gear 42 and a ratio cog wheel 43, both of which are fixed to rotate therewith. The ratio cog wheel 43 is engaged in mesh with an enlarged ratio gear 44. The gear 44 is fixed secured, as indicated at 45, to the inner end of the price selecting lever 27. Consequently, movement of the lever 27 imparts movement to the gears 44, 43, 42, 39 and 38. The train of gears additionally includes a pair of pinions, one of which, indicated at 46, is formed on one end of a worm gear shaft 47 while the other pinion, indicated at 48, is fixedly carried by one end of a screw shaft 49 mounted above the short cylinder 37 and cylinder 34.

Figures 6, 7:
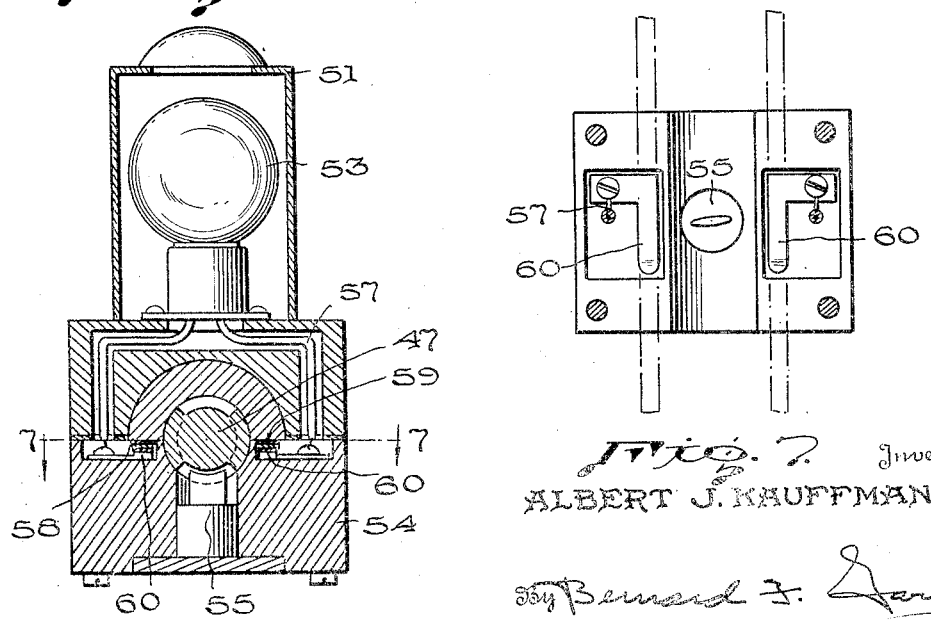
Figure 6 is a detail fragmentary sectional view taken on the line 6—6 of Figure 3 illustrating the manner of mounting the movable carriage on the tubular supporting shaft and the manner of operatively engaging the carriage with the shaft's worm gear.
Figure 7 is a transverse sectional view taken on the line 7—7 of Figure 6 looking in the direction of the arrows illustrating the manner of mounting the carriage racer and the electrical conductor brushes therein.

Fixedly mounted on the tubular supporting shaft 35 within the cylinder 34, is a lamp 50 equipped with a condenser crown casing 51. A similar lamp, indicated at 52, is fixedly mounted in the short cylinder 37, this being also positioned within a condenser crown casing 51. The shaft 35 additionally carries a lamp 53 mounted on a movable carriage 54, the carriage being provided with a racer 55 which extends upwardly through the bottom of the carriage as advantageously illustrated in Figure 6. The upper terminal of the racer is engaged in mesh with the teeth or thread 56 of the worm gear shaft 47. As shown to advantage in Figures 3, 8 and 9, the lower half of the shaft 35 is cut away from a point in close proximity to one end of the shaft, as shown at the right side of Figure 3, to a point appreciably within one end of the cylinder 34 at the left side of Figure 3. This provides bearing portions at both ends of the tubular shaft which engage into the housing frame 36. The lamp 53 is also encased in a condenser crown casing 51. Electric circuit wires 57 extend from a source of energy into engagement with conductor strips 58 mounted on insulated strips 59. The conductor strips 58, also shown in Figures 8 and 9, extend along the entire free edges at the bottom of the open portion of the shaft 35. The carriage 54 is provided with suitable recesses in which electrical brushes or shoes 60 are mounted for engagement with the conductor strips 58. The circuit wires 57 furnish current to the lamps 50 and 52, in an obvious manner, as well as to the lamp 53.

Figure 5:
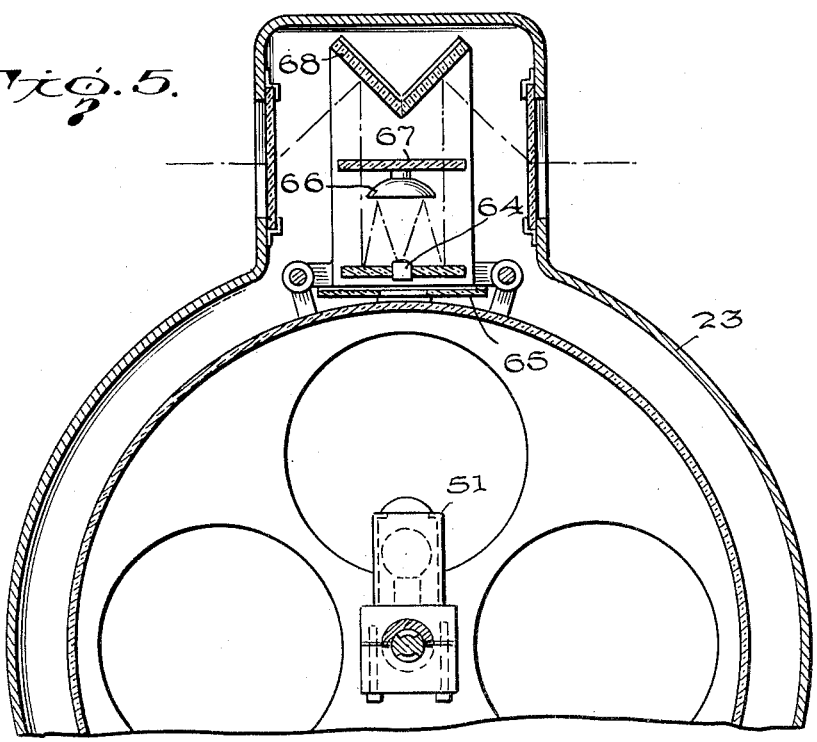
Figure 5 is a fragmentary vertical sectional view taken on the line 5—5 of Figure 3 looking in the direction of the arrow showing the price indicia bearing cylinder and the price reflecting means mounted thereabove.

An indicia viewing apparatus is mounted within the uppermost part of the housing 23 and is shown in Figures 3, 4 and 5 and includes a pair of stationary cupolas 61 and a movable cupola 62. These cupolas are mounted on and supported by screw shaft 49 and a parallel supporting or stabilizing shaft 63. The cupolas 61 are superposed above the short cylinder 37 and the proximate end of the cylinder 34. Movement of the shaft 49 through operation of the price selecting lever 27 is effective to move only the cupola 62 within the confines of the top of the housing 23 as shown in Figures 3, 4 and 5.

Each of the cupolas includes a lens 64 mounted directly above the stepped aperture plate 65. Above the lens 64 is suspended a spherically curved mirror 66 suspended from a transparent aspherical correcting plate 67. Directly above the transparent plate 67 is a V-shaped mirror 68.

As is well known in the art, the amount indicia for each price range forms a peripheral column of figures on the surface of the indicia bearing cylinder and the columns are equi-distant. The indicia images are flashed on the screens 22 from the transparent cylinder 34 and the transparent short cylinder 37 by light reflection from within the cylinder and short cylinder. The indicia is reflected in each instance through the stepped aperture plate 65, to the lens 64 and follows from the aspherical mirror upwardly for impingement with the V-shaped mirror 68 for ultimate reflection on the screens 22. The aperture in plate 65 is preferably stepped as shown in Fig. 10 for the reason that the surface area of the transparent cylinder exposed through the aperture is thereby varied for different portions in the length of the transparent cylinder. This is desirable because the numerals placed thereon are more crowded in certain areas so that a variation in the width of the aperture provides better visibility of the numerals representing the selected price. I have found that good results may also be obtained by use only of a lens and reflecting mirror as shown in the modified form of the invention illustrated in Figure 12. It is of course understood that the lamps and lenses which project the images of the indicia representative of the price per pound and weight remain stationary. The extent of movement of the movable cupola 62 and the carriage 54 is determined by the extent of movement of the price selecting lever. The operator or merchant is governed either by the price indicia positioned on the outer face of the scale housing or by manipulating key mechanism now to be described.

The price selecting key mechanism includes an inside plate 69 and an outside plate 70, each of which is provided with a series of transversely extending slots 71 adapted for the reception of shank 72 of price button 73. The shank of each price button is provided on one margin with an arcuate protuberance 74 and a tooth 75 for engagement with the plates 69 and 70. Each of the shanks is also provided with an aperture 76 adapted for the reception of a coil spring 77. A depression of one of the buttons 73 as shown in Figure 14 flexes the spring 77 and imparts longitudinal movement to the plates 69 and 70 against the resistance of springs 78 employed to anchor the opposite ends of the plates to a fixed part of the housing. Movement of the plates is limited by stop pins 79 also secured to a fixed part of the housing and extend through elongated slots 80 formed in said plates 69 and 70.

As best shown in Fig. 11, the lever 27 preferably has associated with it a housing 101 which serves as a mounting for the spring pressed detent 102 which has its opposed ends extending through threaded openings 103 and 104 in the housing and an end 105 in engagement with toothed rack-like member 106. The detent also has a collar 107 which engages with the spring 108 which holds the detent outwardly in engagement with the rack.

In the above-described illustrated embodiment of this invention, it will be noted that the bearing disc 37 which is associated with the light projecting cupola on the extreme left as seen in Figure 3, indicates the price per pound. The next adjacent cupola which is disposed in association with the edge of the weight-indicating cylinder shows the weight of the article being weighed. The third and movable cupola is that which projects on the screen the total price value resulting from the manual adjustment of price per pound and the weight as established during the weighing operation.

Illumination within the cylinder is provided through the electric circuit wires 57 through a low voltage transformer. As prices increase graduation lines on the indicia chart of the cylinder are illuminated due to the graduation or stepping of apertured plate 65. To better effect this result, contrasting colored semi-transparent material is mounted in the aperture outlining the transparent area on both sides of the apertured plate 65.

It is, of course, to be understood that while I have described herein the preferred embodiments of this invention, I am aware that various changes may be made therein within the scope of the claims hereto appended.

What I claim is:

1. In a weighing scale, in combination, weighing mechanism, a transparent cylinder, equipped with indicia bearing charts, co-acting with said mechanism, a transparent second cylinder equipped with an indicia bearing chart, manual means for rotating the second cylinder independently of said mechanism, means in the cylinder for directing a beam of light through the cylinder for projecting the indicia images of its charts in one direction, means in the second cylinder for directing a beam of light through its chart, and independent means for the cylinder and second cylinder to reflect the images of the cylinder charts and the images of the second cylinder chart.

2. A scale of the character described comprising weighing means and a transparent indicia bearing drum moved by the weighing means, the indicia giving weights and separately giving values based on weights and prices per unit of weight, means movable axially within the drum to project selected value indicia, means located externally of the drum for directing the projected value indicia, means for imparting linear movement to both the projecting and directing means while maintaining them in optical alignment, and fixed projecting means within the drum and fixed directing means externally of the drum for projecting weight indicia.

3. A scale of the character described comprising weighing means and a transparent indicia bearing drum moved by the weighing means, the indicia giving weights and separately giving values based on weights and prices per unit of weight, means movable axially within the drum to project selected value indicia, a second manually rotatable drum bearing unit price indicia, means fixed within the second drum to project selected indicia therefrom, fixed indicia directing means located externally of the drum for the unit price indicia, means located externally of the first mentioned drum for directing indicia projected from said drum, and manually operable means for jointly rotating the second drum and moving linearly and in optical alignment the indicia projecting and directing means of the first mentioned drum.

4. A scale of the character described comprising weighing means and a transparent indicia bearing drum moved by the weighing means, the drum indicia including a series of indicia giving weights and a plurality of series giving values based on weights and on prices per unit of weight, a second transparent drum in axial alignment with the first drum, said second drum bearing prices per unit of weight, fixed means for projecting selected indicia from the second drum, means for manually rotating said second drum independently of the first drum, projecting means within the first drum for projecting selected values, a rotatable shaft extending axially within the first drum, said shaft being rotatable independently of the weighing mechanism, a connection between the rotatable shaft and the value projecting means whereby rotation of the shaft imparts linear movement to the projecting means, and drive means connecting the shaft and the means for rotating the second drum whereby the projecting means projects a value based on the unit price projected from the second drum.

ALBERT J. KAUFFMAN.

REFERENCES CITED

The following references are of record in the file of this patent:

UNITED STATES PATENTS

| Number | Name | Date |
|---|---|---|
| 1,166,658 | Buckingham | Jan. 4, 1916 |
| 1,721,398 | Jacob | July 16, 1929 |
| 1,880,415 | Carroll | Oct. 4, 1932 |
| 1,880,417 | Carroll | Oct. 4, 1932 |
| 1,882,774 | Carroll | Oct. 18, 1932 |
| 1,918,877 | Templeton | July 18, 1933 |
| 2,051,811 | Asmussen | Aug. 25, 1936 |
| 2,172,802 | Marshall et al. | Sept. 12, 1939 |
| 2,334,326 | Hem | Nov. 16, 1943 |
| 2,341,226 | Marshall et al. | Feb. 8, 1944 |